United States Patent
Wang et al.

(10) Patent No.: US 11,178,275 B2
(45) Date of Patent: Nov. 16, 2021

(54) METHOD AND APPARATUS FOR DETECTING ABNORMALITY OF CALLER

(71) Applicant: Samsung Electronics Co., Ltd., Suwon-si (KR)

(72) Inventors: Chengjun Wang, Nanjing (CN); Xin Liu, Nanjing (CN); Feng Tang, Nanjing (CN); Suxia Li, Nanjing (CN); Bo Peng, Nanjing (CN); Lei Wan, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/739,662

(22) Filed: Jan. 10, 2020

(65) Prior Publication Data

US 2020/0228648 A1  Jul. 16, 2020

(30) Foreign Application Priority Data

Jan. 15, 2019 (CN) ......................... 201910034395.X

(51) Int. Cl.
*H04M 3/22* (2006.01)
*H04M 3/42* (2006.01)
*G06N 3/08* (2006.01)

(52) U.S. Cl.
CPC ............ *H04M 3/2281* (2013.01); *G06N 3/08* (2013.01); *H04M 3/42059* (2013.01);
(Continued)

(58) Field of Classification Search
CPC ........... H04M 3/2281; H04M 3/42059; H04M 2203/6027; H04M 2203/045;
(Continued)

(56) References Cited

U.S. PATENT DOCUMENTS 8,548,149 B2 * 10/2013 Czachor, Jr. .......... H04M 3/527
379/210.02
9,906,642 B2 * 2/2018 Jing ...................... H04W 8/205
(Continued)

FOREIGN PATENT DOCUMENTS

CN  104636580 A  5/2015
CN  106714178 A  5/2017
(Continued)

OTHER PUBLICATIONS

International Search Report dated Apr. 23, 2020, issued in International Patent Application No. PCT/KR2020/000571.
(Continued)

*Primary Examiner* — Binh Kien Tieu
(74) *Attorney, Agent, or Firm* — Jefferson IP Law, LLP

(57) ABSTRACT

A method and an apparatus for detecting an abnormality of a caller are provided. The method includes at the beginning of a call, acquiring, by a terminal device, real voice/video data of a call object who needs abnormality detection and a corresponding pre-trained multi-stage neural network detection model, during the call, collecting, by the terminal device, call data according to a preset data collection policy, for each call object, inputting the currently collected call data and the real voice/video data of the call object into the model of the call object, and determining whether the call object is abnormal according to a detection result output by the model, in which the call data includes image data and/or voice data, and an identification manner adopted by the model includes face identification, voiceprint identification, limb movement identification, and/or lip language identification. By adopting the disclosure, the abnormality of the caller may be accurately detected, and the voice forgery and the video forgery mimicked by AI during a call may be accurately identified.

19 Claims, 2 Drawing Sheets

(52) U.S. Cl.
CPC ............ *H04M 2203/6027* (2013.01); *H04M 2203/6045* (2013.01); *H04M 2203/6054* (2013.01)

(58) Field of Classification Search
CPC ......... H04M 2203/6054; H04M 3/436; H04M 3/43102; H04M 3/4211; H04M 3301/41; G06N 3/04; G06N 3/08; G06N 99/005; G06L 17/18; G06L 15/16; G06L 17/04; G06L 17/22
USPC .... 379/88.01, 88.02, 114.14, 142.01, 142.05
See application file for complete search history.

(56) References Cited

U.S. PATENT DOCUMENTS

| | | | |
|---|---|---|---|
| 10,404,941 B1* | 9/2019 | Clements | H04N 7/147 |
| 10,810,212 B2* | 10/2020 | Cudak | H04L 63/1441 |
| 10,965,807 B2 | 3/2021 | Côté et al. | |
| 2008/0198991 A1 | 8/2008 | Saito | |
| 2011/0188712 A1 | 8/2011 | Yoo et al. | |
| 2012/0069028 A1 | 3/2012 | Bouguerra | |
| 2012/0262271 A1* | 10/2012 | Torgersrud | G06F 21/32 340/5.53 |
| 2013/0063548 A1* | 3/2013 | Rosenberg | H04N 7/15 348/14.09 |
| 2013/0162752 A1 | 6/2013 | Herz et al. | |
| 2016/0078281 A1* | 3/2016 | Gongaware | G06K 9/00288 382/118 |
| 2016/0127682 A1 | 5/2016 | Turbell | |
| 2016/0173699 A1* | 6/2016 | Brown | H04M 3/382 379/93.12 |
| 2017/0094053 A1 | 3/2017 | Hogg, Jr. | |
| 2017/0134574 A1* | 5/2017 | Winkler | H04M 3/4211 |
| 2017/0163797 A1* | 6/2017 | Jing | H04M 3/42059 |
| 2018/0101751 A1 | 4/2018 | Ghosh et al. | |
| 2018/0197539 A1 | 7/2018 | Kang et al. | |
| 2018/0260553 A1* | 9/2018 | Hoyos | G06F 21/32 |
| 2019/0020759 A1* | 1/2019 | Kuang | G06N 20/00 |
| 2019/0141183 A1* | 5/2019 | Chandrasekaran | H04M 3/42059 |
| 2019/0174095 A1* | 6/2019 | Rosenberg | H04N 7/15 |
| 2019/0220583 A1* | 7/2019 | Douglas | G06F 21/316 |
| 2019/0370452 A1* | 12/2019 | Nakajima | G06F 21/32 |
| 2019/0392842 A1* | 12/2019 | Khoury | G10L 17/04 |
| 2020/0057855 A1* | 2/2020 | Shear | G06F 21/575 |

FOREIGN PATENT DOCUMENTS

| | | |
|---|---|---|
| CN | 106790054 A | 5/2017 |
| CN | 107111427 A | 8/2017 |
| CN | 107301396 A | 10/2017 |
| CN | 107666583 A | 2/2018 |
| CN | 107770478 A | 3/2018 |
| CN | 108198574 A | 6/2018 |
| CN | 108537289 A | 9/2018 |
| CN | 109147799 A | 1/2019 |
| JP | 2008-205879 A | 9/2008 |
| KR | 10-2011-0090731 A | 8/2011 |
| WO | 2018/071396 A1 | 4/2018 |

OTHER PUBLICATIONS

Chinese Office Action dated Jun. 17, 2020, issued in Chinese Patent Application No. 201510170269.9.
Chinese Notice of Allowance dated Dec. 31, 2020, issued in Chinese Patent Application No. 201910034395.X.

* cited by examiner

METHOD AND APPARATUS FOR DETECTING ABNORMALITY OF CALLER

CROSS-REFERENCE TO RELATED APPLICATION(S)

This application is based on and claims priority under 35 U.S.C. § 119(a) of a Chinese patent application number 201910034395.X, filed on Jan. 15, 2019, in the Chinese Intellectual Property Office, the disclosure of which is incorporated by reference herein in its entirety.

BACKGROUND

1. Field

The disclosure relates to artificial intelligence technology. More particularly, the disclosure relates to a method and an apparatus for detecting an abnormality of a caller.

2. Description of Related Art

With the development of technology, it becomes easier and easier to fake a voice or a video of another person. Hearing is false, and seeing may not be true. A video call or a voice call in an existing mobile phone, pad, or another device identifies authenticity of a caller mainly based on a mobile phone number, a communication software number (such as WeChat), and human instinct judgment. These devices do not provide another way to identify the authenticity of the caller.

It becomes easier and easier for Artificial intelligence (AI) to imitate a voice of another person. At present, AI-based software for imitating sounds has been published, which may require a sound sample of only one minute to imitate anyone's voice. However, its sound has background noise and a weak robot feature. Moreover, it may not imitate people's breathing in talking. As such, its computer voice characteristic may still be heard.

At present, AI technology has already broken through a voiceprint system. At the GeekPwn2017 "AI Sound Imitation and Sound Verification Offensive and Defensive Competition", five groups of players simulated a voiceprint characteristic of a voice actor of Daji, who is a hero of "Glory of Kings", based on a sound sample provided by the voice actor, and synthesized an "attack" voice to attack four devices with a voiceprint identification function provided at the scene, to cheat and pass verification of a "voiceprint lock".

It also becomes easier and easier for AI to imitate a video of another person. The University of Washington developed a machine learning algorithm that may turn a sound clip into lip-shaped-consistent video contents. They use artificial intelligence to make a video of former president of the U.S. Barack Obama talking about multiple topics such as terrorism, which shows what Mr. Obama had never said before, with a realistic effect.

AI algorithm and software are becoming more and more widespread, popular, and intelligent. There has been more and more AI face-changing/voice-changing software that ordinary people may also easily use, quickly spreading like viruses.

The inventor finds, during the process of implementing the subject matter disclosed herein, that the judgment made by an existing call device on a voice and a video image of a caller mainly based on a phone number, a communication software number (such as WeChat), and human instincts may not accurately identify a video forgery or a voice forgery imitated by the AI. As such, the accuracy of the identity of the caller during a call is lower.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for detecting an abnormality of a caller, which may improve the accuracy of identifying a voice forgery and a video forgery.

Additional aspects will be set forth in part in the description which follows and, in part, will be apparent from the description, or may be learned by practice of the presented embodiments.

In accordance with an aspect of the disclosure, a method for detecting an abnormality of a caller is provided. The method includes at the beginning of a call, acquiring, by a terminal device, a user identifier of a call object, at the beginning of the call, acquiring, by the terminal device, real voice/video data of the call object and a pre-trained multi-stage neural network detection model of the call object, when the user identifier of the call object meets a predetermined criterion, during the call, collecting, by the terminal device, call data of the call according to a preset data collection policy, inputting the collected call data and the real voice/video data of the call object into the pre-trained multi-stage neural network detection model of the call object, and determining whether an abnormality of identification of the call object is detected according to a detection result output by the pre-trained multi-stage neural network detection model of the call object, wherein the collected call data comprises at least one of image data or voice data, and wherein an identification manner adopted by the pre-trained multi-stage neural network detection model of the call object comprises at least one of a face identification, a voiceprint identification, a limb movement identification, or a lip language identification.

In an implementation, determining, by the terminal device, whether the real voice/video data of the call object is locally stored according to the user identifier of the call object, if the real voice/video data of the call object is locally stored, acquiring, by the terminal device, the real voice/video data locally, and if the real voice/video data of the call object is not locally stored, acquiring the real voice/video data of the call object from a cloud server.

In an implementation, the adding of the collected call data to the real voice/video data of the corresponding user stored by the cloud server further comprises adding the abnormal situation in association with the collected call data.

In an implementation, the abnormal situation comprises at least one of coughing and sneezing.

In an implementation, the data collection policy comprises one of collecting the call data for only a preset length of time from the beginning of the call, or collecting the call data periodically according to a preset collection cycle.

In an implementation, the terminal device acquires the pre-trained multi-stage neural network detection model of the call object from a cloud server.

In an implementation, the pre-trained multi-stage neural network detection model of the call object is a two-stage neural network detection model of the call object, a training of the pre-trained multi-stage neural network detection model of the call object comprises generating voice/video forgery data according to the real voice/video data of the call object and using a preset AI generator, and performing a two-stage training on the two-stage neural network detection model of the call object using the real voice/video data of the call object and the voice/video forgery data, wherein in a first-stage training of the two-stage training on the two-stage neural network detection model of the call object, a single detection of a corresponding detection type is performed using at least one of a face classification detection model, a voiceprint classification detection model, a limb movement classification detection model, or a lip language classification detection model, and input data for a second-stage training of the two-stage training on the two-stage neural network detection model of the call object is generated according to acquired corresponding feature data, and in the second-stage training, the acquired corresponding feature data input is detected using a fully connected convolutional network, and a current training parameter of the two-stage neural network detection model of the call object is adjusted using a training result of the second-stage training.

In an implementation, when an application for making the call enables a beauty function, the terminal device collects image data without a beauty treatment.

In an implementation, when the call is a video call, a triggering opportunity for determining whether an abnormality of identification of the call object is detected when the terminal device detects that a human face appears in a video of the call.

In an implementation, the determining whether the call object is abnormal comprises for each call object, determining, by the terminal device, whether an abnormality of identification of the call object is detected according to a detection result of a preset number of times of the pre-trained multi-stage neural network detection model of the call object, the preset number of times being equal to or greater than 1.

In an implementation, the method further includes when an abnormality of identification of the call object is detected, triggering, by the terminal device, a corresponding abnormality alarm process.

In an implementation, the abnormality alarm process comprises displaying, on the terminal device, prompt information indicating that the identification of the call object is abnormal, notifying a real contact person corresponding to the call object through a preset alarm communication manner that someone is impersonating the real contact person to talk with a user of the terminal device, and notifying a cloud server to mark a call software number being used in the call by the corresponding call object as abnormal.

In an implementation, the method further includes when it is impossible to determine whether an abnormality of identification of the call object is detected, performing one of displaying, by the terminal device, corresponding prompt information, triggering a user of the terminal device to ask a question to the call object to determine an authenticity of the call object, or re-collecting call data, and determining whether an abnormality of identification of the call object is detected using the newly collected call data and the pre-trained multi-stage neural network detection model of the call object.

In an implementation, before the collected call data and the real voice/video data of the call object are input into the pre-trained multi-stage neural network detection model of the call object, the method further comprises performing an initial identification of the call object based on the collected call data and according to a preset identity identification mode, and wherein the preset identity identification mode comprises at least one of a call software number identification, a voiceprint identification, a face identification, a limb movement identification, or a lip language identification.

In an implementation, the method further includes when a result of the initial identification comprises a voiceprint detection abnormality based on the collected call data comprising a sound in an abnormal situation, and the detection result of the pre-trained multi-stage neural network detection model of the call object is normal, triggering, by the terminal device, adding the collected call data to the real voice/video data of a corresponding user stored by a cloud server.

In an implementation, when the terminal device is an access control intercom terminal, acquiring the user identifier of the call object comprises searching, by the terminal device, for a matched user from a cloud server based on face and sound data collected by a voice/video collecting component of the access control intercom terminal, if the search is successful, acquiring the user identifier, and if the search is not successful, determining the call object as a stranger.

In accordance with another aspect of the disclosure, an apparatus for detecting an abnormality of a caller, configured in a terminal device is provided. The apparatus includes at least one processor configured to acquire, at the beginning of a call, a user identifier of a call object, acquire, at the beginning of the call, real voice/video data of the call object and a pre-trained multi-stage neural network detection model of the call object, when the user identifier of the call object meets a predetermined criterion, collect, during the call, call data of the call according to a preset data collection policy, input the collected call data of the call and the real voice/video data of the call object into the pre-trained multi-stage neural network detection model of the call object, and determine whether an abnormality of identification of the call object is detected according to a detection result output by the pre-trained multi-stage neural network detection model of the call object, wherein the collected call data comprises at least one of image data or voice data, and wherein an identification manner adopted by the pre-trained multi-stage neural network detection model of the call object comprises at least one of a face identification, a voiceprint identification, a limb movement identification, or a lip language identification.

In an implementation, the at least one processor is to determine whether the real voice/video data of the call object is locally stored according to the user identifier of the call object, if the real voice/video data of the call object is locally stored, acquire the real voice/video data locally, and if the real voice/video data of the call object is not locally stored, acquire the real voice/video data of the call object from a cloud server.

In an implementation, the data collection policy comprises one of collecting the call data for only a preset length of time from the beginning of the call, or collecting the call data periodically according to a preset collection cycle.

In an implementation, the at least one processor is to acquire the pre-trained multi-stage neural network detection model of the call object from a cloud server.

In an implementation, wherein the pre-trained multi-stage neural network detection model of the call object is a two-stage neural network detection model of the call object, wherein a training of the pre-trained multi-stage neural network detection model of the call object comprises: generating voice/video forgery data according to the real voice/video data of the call object and using a preset AI generator, and performing a two-stage training on the two-stage neural network detection model of the call object using the real voice/video data of the call object and the voice/video forgery data, wherein in a first-stage training of the two-stage training on the two-stage neural network detection model of the call object: a single detection of a corresponding detection type is performed using at least one of a face classification detection model, a voiceprint classification detection model, a limb movement classification detection model, or a lip language classification detection model, and input data for a second-stage training of the two-stage training on the two-stage neural network detection model of the call object is generated according to acquired corresponding feature data, and wherein in the second-stage training: the acquired corresponding feature data input is detected using a fully connected convolutional network, and a current training parameter of the two-stage neural network detection model of the call object is adjusted using a training result of the second-stage training.

In an implementation, at least one processor is further configured to collect image data without a beauty treatment when an application for making the call enables a beauty function.

In an implementation, the at least one processor is further configured to trigger, when the call is a video call, determining whether an abnormality of identification of the call object is detected when detecting that a human face appears in a video of the call.

In an implementation, the at least one processor is further configured to determine whether an abnormality of identification of the call object is detected according to a detection result of a preset number of times of the pre-trained multi-stage neural network detection model of the call object, the preset number of times being equal to or greater than 1.

In an implementation, the at least one processor is further configured to trigger a corresponding abnormality alarm process when an abnormality of identification of the call object is detected.

In an implementation, the apparatus further comprises a display operatively coupled to the at least one processor, and wherein the at least one processor is further configured to control the display to: display, on the terminal device, prompt information indicating that the identification of the call object is abnormal, and wherein the at least one processor is further configured to: notify a real contact person corresponding to the call object through a preset alarm communication manner that someone is impersonating the real contact person to talk with a user of the terminal device, and notify a cloud server to mark a call software number being used in the call by the corresponding call object as abnormal.

In an implementation, the apparatus further comprises a display operatively coupled to the at least one processor, and wherein the at least one processor is further configured to, when it is impossible to determine whether an abnormality of identification of the call object is detected, perform one of: control the display to display corresponding prompt information, trigger a user of the terminal device to ask a question to the call object to determine an authenticity of the call object, or re-collect call data and determine whether an abnormality of identification of the call object is detected using the newly collected call data and the pre-trained multi-stage neural network detection model of the call object.

In an implementation, the at least one processor is further configured to, before the collected call data and the real voice/video data of the call object are input into the pre-trained multi-stage neural network detection model of the call object, perform an initial identification of the call object based on the collected call data and according to a preset identity identification mode, and wherein the preset identity identification mode comprises at least one of a call software number identification, a voiceprint identification, a face identification, a limb movement identification, or a lip language identification.

In an implementation, the at least one processor is further configured to, when a result of the initial identification comprises a voiceprint detection abnormality based on the collected call data comprising a sound in an abnormal situation, and the detection result of the pre-trained multi-stage neural network detection model of the call object is normal, trigger adding the collected call data to the real voice/video data of a corresponding user stored by a cloud server.

In an implementation, the at least one processor is further configured to: when the terminal device is an access control intercom terminal, acquire the user identifier of the call object, wherein, to acquire the user identifier of the call object, the at least one processor if configured to: search for a matched user from a cloud server based on face and sound data collected by a voice/video collecting component of the access control intercom terminal, if the search is successful, acquire the user identifier, and if the search is not successful, determine the call object as a stranger.

In accordance with another aspect of the disclosure, a non-volatile computer-readable storage medium storing instructions is provided. The instructions, when executed by a processor, cause the processor to perform operations of the above-described method for detecting an abnormality of a caller.

In accordance with another aspect of the disclosure, an electronic device is provided. The electronic device includes the above-described non-transitory computer-readable storage medium configured to store one or more computer programs including instructions that, when executed by at least one processor, cause the processor to control for: at the beginning of a call, acquiring, by a terminal device, a user identifier of a call object, at the beginning of the call, acquiring, by the terminal device, real voice/video data of the call object and a pre-trained multi-stage neural network detection model of the call object, when the user identifier of the call object meets a predetermined criterion, during the call, collecting, by the terminal device, call data of the call according to a preset data collection policy, inputting the collected call data and the real voice/video data of the call object into the pre-trained multi-stage neural network detection model of the call object, and determining whether an abnormality of identification of the call object is detected according to a detection result output by the pre-trained multi-stage neural network detection model of the call object, wherein the collected call data comprises at least one of image data or voice data, and wherein an identification manner adopted by the pre-trained multi-stage neural network detection model of the call object comprises at least one of a face identification, a voiceprint identification, a limb movement identification, or a lip language identification.

In view of the above, according to the solution for detecting an abnormality of a caller provided by the disclosure, the terminal device collects, during the call, call data according to a preset data collection policy, for each call object, the currently collected call data and the real voice/video data of the call object are input into the multi-stage neural network detection model of the call object, and it is determined whether the call object is abnormal according to a detection result output by the multi-stage neural network detection model, in which an identification manner adopted by the multi-stage neural network detection model includes face identification, voiceprint identification, and/or lip language identification. In this way, the voice forgery and video forgery may be identified during the call based on real-time call data and using a pre-trained multi-stage neural network detection model, which may improve the accuracy of detecting abnormal people.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
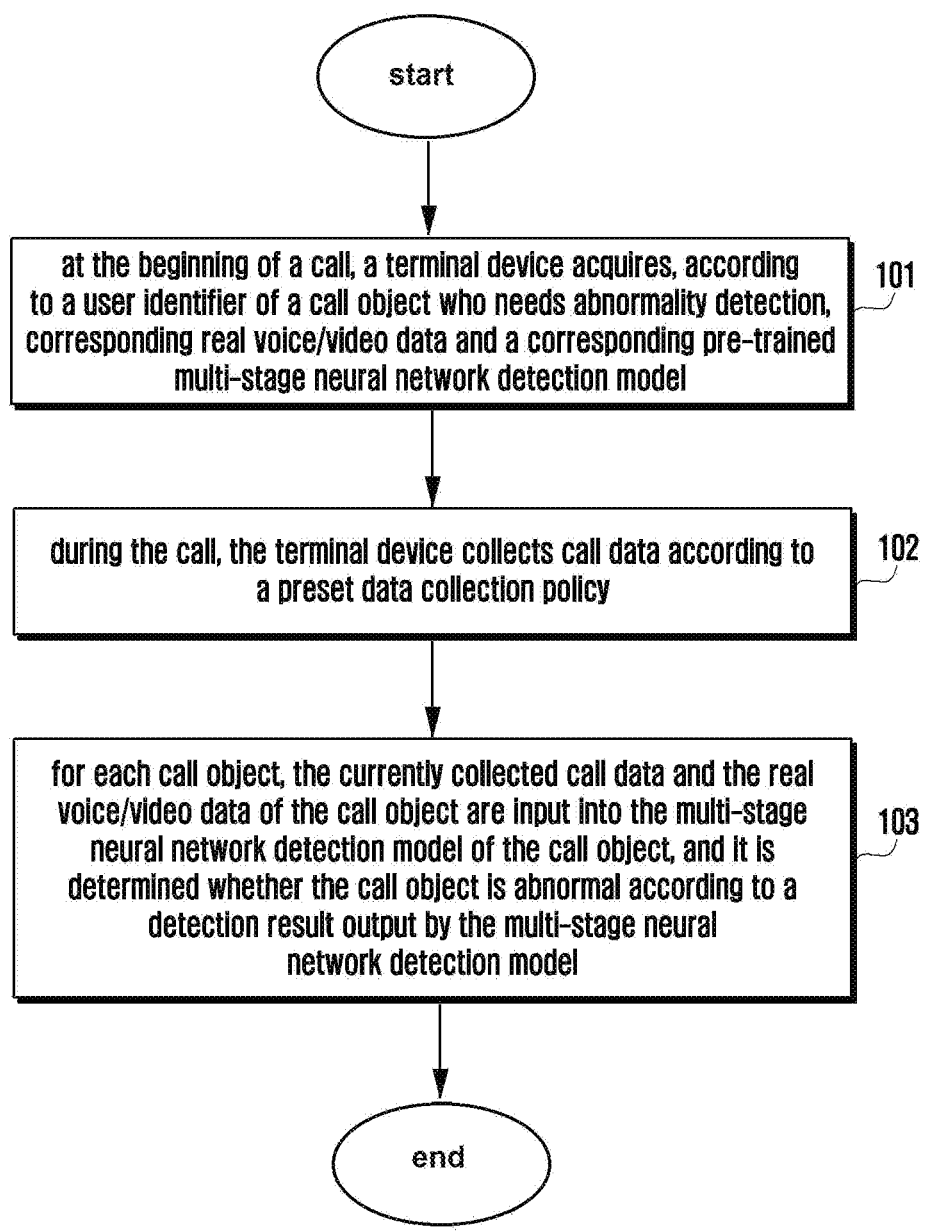
FIG. 1 is a schematic flowchart of a method according to an embodiment of the disclosure.

FIG. 1 is a schematic flowchart of a method according to an embodiment of the disclosure.

Referring to FIG. 1, a method for detecting an abnormality of a caller implemented in the embodiment mainly includes:

At operation 101, at the beginning of a call, a terminal device acquires, according to a user identifier of a call object who needs abnormality detection, corresponding real voice/video data and a corresponding pre-trained multi-stage neural network detection model.

At this operation, the terminal device needs to acquire the real voice/video data of the call object that currently needs abnormality detection and the corresponding pre-trained multi-stage neural network detection model when starting the call, so as to use the data and the model to perform the abnormality detection for a corresponding person during the call.

In this case, for acquiring the real voice/video data of the call object, a local search may be preferably selected to save time and network resource overhead.

In an implementation, the real voice/video data of the call object may be acquired through a method described as follows.

The terminal device determines whether the real voice/video data of the call object is locally stored according to the user identifier of the call object. If the real voice/video data of the call object is locally stored, the terminal device acquires the real voice/video data locally; otherwise, the terminal device acquires the real voice/video data of the call object from a cloud server.

For acquiring the pre-trained multi-stage neural network detection model of the call object, it needs to be acquired from the cloud server. That is, the terminal device acquires the corresponding multi-stage neural network detection model from the cloud server according to the user identifier of the call object.

In practice, a user may configure for which call object the abnormality detection is required to be performed according to actual requirements.

In practice, a voiceprint and a face feature of each user are collected by a system or acquired from a public platform through user authorization. A real voice/video of each user are also collected by the system or acquired from the public platform through the user authorization. The user may authorize the voice/video of the user to the platform for voice/video abnormality detection of the platform, of which a method is described as follows. Each user may authorize a chat app to collect voice/video data for abnormality verification. The authorization may be for anyone or for some contacts manually selected by the user. For example, the user only wants to authorize the voice/video of the user for use by family and closest friends. The user may customize a scope of contacts for abnormality detection, of which a method is described as follows. An interface is provided for the user to enable/disable an abnormality detection function. If the abnormality detection function is enabled, a specified contact may be selected, and the abnormality detection is performed for only such specified people with a higher security level.

In an implementation, when the terminal device is an access control intercom terminal, the identifier of the call object may be acquired using a method described as follows.

The terminal device searches for a matched user from the cloud server based on face and sound data collected by a voice/video collecting component of the access control. If the search is successful, the corresponding user identifier is acquired; otherwise, the corresponding call object is determined as a stranger.

At operation 102, during the call, the terminal device collects call data according to a preset data collection policy.

At this operation, the data collection policy may be specifically configured by those skilled in the art according to actual requirements. In order to save system overhead, data for a period of time may be extracted every fixed time, without running all the time, e.g., one minute or thirty seconds. In addition, the abnormality detection may be performed only at the beginning of the call. These manners may be selected or configured by the user on an interface. Specifically, two manners described as follows may be adopted.

Manner 1: call data for a preset length of time may be collected only when the call starts.

Manner 2: call data may be collected periodically according to a preset collection cycle.

At operation 103, for each call object, the currently collected call data and the real voice/video data of the call object are input into the multi-stage neural network detection model of the call object, and it is determined whether the call object is abnormal according to a detection result output by the multi-stage neural network detection model.

In this case, the call data includes image data and/or voice data, and an identification manner adopted by the multi-stage neural network detection model includes face identification, voiceprint identification, limb movement identification, and/or lip language identification.

At this operation, the abnormality identification of the call object is performed by using the pre-trained multi-stage neural network detection model, which may effectively improve the accuracy of the identification.

In an implementation, the multi-stage neural network detection model may be a two-stage neural network detection model, but is not limited thereto, and may also be a three-stage or more stage neural network detection model. In practice, the higher the number of stages used is, the higher the identification accuracy of the model is, but the larger the computational overhead is. Those skilled in the art may comprehensively consider the accuracy requirements of the identification and the computational overhead, and select a neural network detection model adopting the appropriate number of stages.

In an implementation, in order to further improve the detection accuracy, especially to accurately identify a voice forgery and a video forgery mimicked by AI technology, when the multi-stage neural network detection model is a two-stage neural network detection model, the cloud server may train the multi-stage neural network detection model in advance using a method described as follows.

First, a training sample is generated: corresponding voice/video forgery data is generated according to the real voice/video data of the call object and using a preset AI generator.

It should be noted herein that the corresponding voice/video forgery data is generated by using the preset AI generator, so that forgery label sample data used for model training has a robot feature corresponding to the AI generator, and thus a voice/video forgery mimicked by an AI tool during a call may be accurately identified using the trained two-stage neural network detection model, thereby improving the accuracy of abnormality detection of the caller.

Then, the two-stage model training:

Two-stage training is performed on the two-stage neural network detection model of the call object using the real voice/video data of the call object and the voice/video forgery data.

In this case, in a first-stage training, a single detection of a corresponding detection type is performed using a face classification detection model, a voiceprint classification detection model, a limb movement classification detection model, and/or a lip language classification detection model, and input data for a second stage is generated according to the acquired corresponding feature data; in a second-stage training, the feature data input at this stage is detected using a fully connected convolutional network, and a current training parameter of the two-stage neural network detection model is adjusted using a training result of this stage.

In practice, the AI generator used in the above training may be configured and updated by the cloud according to an AI generator appearing in practice.

In an implementation, in order to further improve the accuracy of the abnormality detection of the caller, considering that video call software sometimes provides a beauty function, the call software with the beauty function usually makes a large modification to a human face and modifies image data. At this time, if the detection is performed based on the image data after the beauty treatment, the detection result may be abnormality, thereby affecting the accuracy of the detection. At this time, an image of the call software before the beauty may be collected for human face identification. That is, when an application for making the call enables the beauty function and when the terminal device performs the collection, image data without the beauty treatment is collected. Further, at this time, a comprehensive judgment may also be made in conjunction with voiceprint abnormality detection.

In an implementation, considering that during the video call, a human face may not always be in front of a camera, the abnormality detection may be in a form of triggering. For example, a face detection module is running first, and the abnormality detection is further performed when a human face is detected. That is, when the call is a video call, a triggering opportunity for determining whether the call object is abnormal is: when the terminal device detects that a human face appears in a video of the current call.

In an implementation, in order to improve the accuracy of the detection, it may be determined whether the call object is abnormal according to multiple detection results, which is described as follows.

For each call object, the terminal device determines whether the call object is abnormal according to a detection result of the preset number of times of the multi-stage neural network detection model of the call object, and the preset number of times is equal to or greater than 1.

The above preset number of times may be configured by those skilled in the art according to actual requirements.

In an implementation, when an abnormality is detected, the terminal device may notify a real contact person through another communication manner (such as a short message or an email) that someone is impersonating the person to talk with the user using the terminal device; and notify the server of a software number being communicated, mark as abnormal. The above notifications may be automatic or triggered by key confirmation of the user. Such purpose may be achieved using technical means described as follows.

When it is determined that the call object is abnormal, the terminal device triggers a corresponding abnormality alarm process.

In an implementation, the abnormality alarm process includes:

displaying, on the terminal device, prompt information indicating that the corresponding call object is abnormal; notifying the corresponding real contact person through a preset alarm communication manner that someone is impersonating the contact person to talk with the user using the terminal device; notifying the cloud server to mark the call software number being currently used by the corresponding call object as abnormal.

In an implementation, considering that the detection result of the multi-stage neural network detection model may be information of uncertain abnormality, at this time, the user may be notified to use another manner for the detection, or it is determined by re-executing the abnormality detection. Specifically, such purpose may be achieved using a method described as follows.

When it is impossible to determine whether the call object is abnormal according to the detection result of the multi-stage neural network detection model, the terminal device displays corresponding prompt information.

The user is triggered to ask a question to the corresponding call object to determine authenticity of identity of the call object. Alternatively, call data is re-collected and it is determined whether the call object is abnormal using the newly collected call data and the multi-stage neural network detection model of the call object.

In an implementation, before the abnormality detection starts, the user identity may be roughly determined. There are several methods including call software number identification, voiceprint identification, face identification, limb movement identification, and/or lip language identification. Initial identity identification does not need to identify an abnormality of AI modification, and may be implemented based on existing voiceprint identification, face identification, limb movement identification and/or lip language identification algorithms, specifically described as follows.

Before the currently collected call data and the real voice/video data of the call object are input into the multi-stage neural network detection model of the call object, the method further includes:

performing initial identification based on the call data and according to a preset identity identification mode, in which an initial identity identification mode includes: call software number identification, voiceprint identification, face identification, limb movement identification, and/or lip language identification.

In an implementation, when the collected call data includes a sound in an abnormal situation (such as coughing, sneezing, etc.), a result of the initial identification may be voiceprint detection abnormality. At this time, if the detection result of the multi-stage neural network detection model is normal, the terminal device may trigger adding the corresponding call data to the real voice/video data of the corresponding user stored by the cloud server to update a corresponding database.

Corresponding to the above method embodiments, an embodiment of the disclosure further provides an apparatus for detecting an abnormality of a caller, which is configured in a terminal device.

Figure 2:
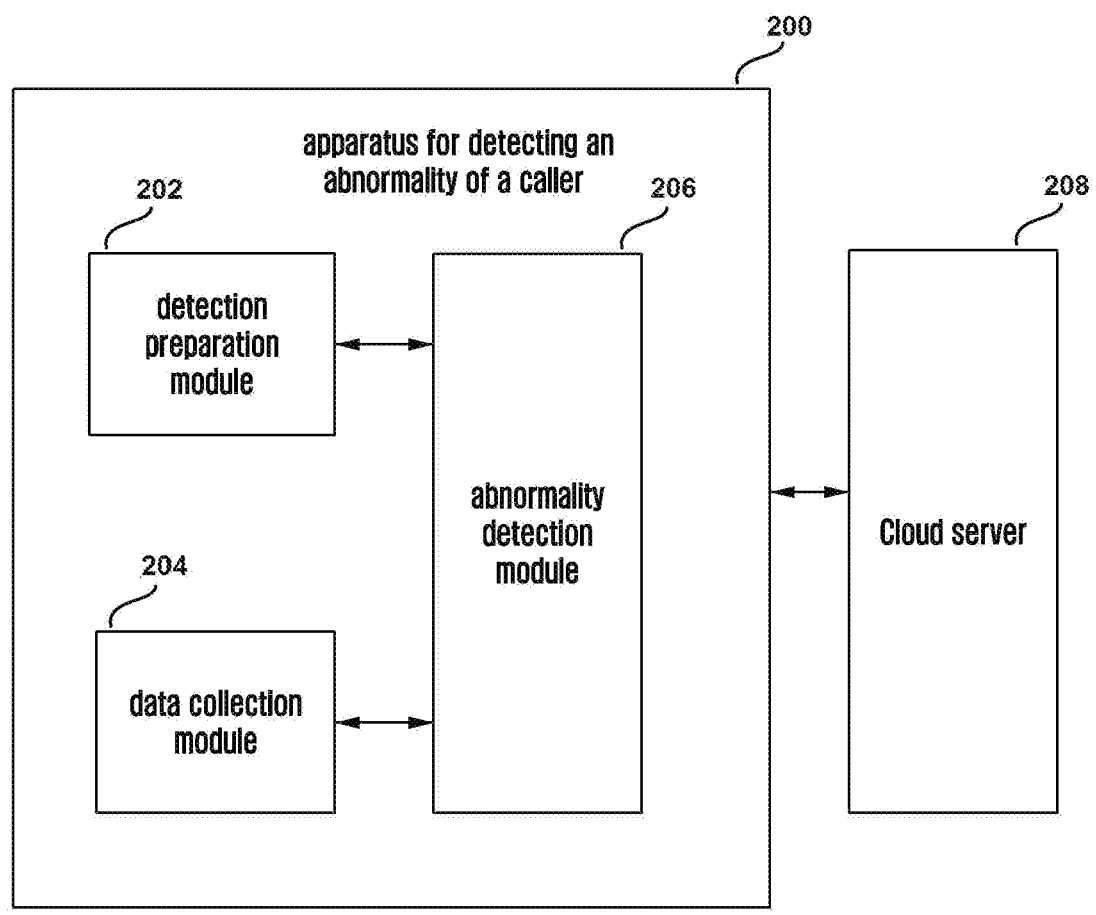
FIG. 2 is a schematic structural diagram of an apparatus according to an embodiment of the disclosure.

FIG. 2 is a schematic structural diagram of an apparatus for detecting an abnormality of a caller 200 according to an embodiment of the disclosure.

Referring to FIG. 2, the apparatus includes:

a detection preparation module 202, to acquire, at the beginning of a call according to a user identifier of a call object who needs abnormality detection, corresponding real voice/video data and a corresponding pre-trained multi-stage neural network detection model;

a data collection module 204, to collect, during the call, call data according to a preset data collection policy;

an abnormality detection module 206, to input, for each call object, the currently collected call data and the real voice/video data of the call object into the multi-stage neural network detection model of the call object, and determine whether the call object is abnormal according to a detection result output by the multi-stage neural network detection model;

wherein the call data comprises image data and/or voice data, and an identification manner adopted by the multi-stage neural network detection model comprises face identification, voiceprint identification, limb movement identification, and/or lip language identification.

In an implementation, the detection preparation module 202 is to determine whether the real voice/video data of the call object is locally stored according to a user identifier of the call object; if the real voice/video data of the call object is locally stored, acquire the real voice/video data locally; otherwise, acquire the real voice/video data of the call object from a cloud server 208.

In an implementation, the data collection policy comprises:

collecting call data for a preset length of time only when the call starts; or collecting call data periodically according to a preset collection cycle.

In an implementation, the detection preparation module 202 is to acquire the corresponding multi-stage neural network detection model from a cloud server according to the user identifier of the call object.

In an implementation, the multi-stage neural network detection model is a two-stage neural network detection model;

training of the multi-stage neural network detection model comprises:

generating corresponding voice/video forgery data according to the real voice/video data of the call object and using a preset AI generator;

performing two-stage training on the two-stage neural network detection model of the call object using the real voice/video data of the call object and the voice/video forgery data;

wherein in a first-stage training, a single detection of a corresponding detection type is performed using a face classification detection model, a voiceprint classification detection model, a limb movement classification detection model, and/or a lip language classification detection model, and input data for a second stage is generated according to the acquired corresponding feature data; in a second-stage training, the feature data input at this stage is detected using a fully connected convolutional network, and a current training parameter of the two-stage neural network detection model is adjusted using a training result of this stage.

In an implementation, the data collection module 204 is to collect image data without beauty treatment when an application for making the call enables a beauty function.

In an implementation, the abnormality detection module 206 is to trigger, when the call is a video call, determining whether the call object is abnormal only when detecting that a human face appears in a video of the current call.

In an implementation, the abnormality detection module 206 is to, for each call object, determine whether the call object is abnormal according to a detection result of the preset number of times of the multi-stage neural network detection model of the call object, the preset number of times being equal to or greater than 1.

In an implementation, the abnormality detection module 206 is further to trigger a corresponding abnormality alarm process when determining that the call object is abnormal.

In an implementation, the abnormality detection module 206 is to display, on the terminal device, prompt information indicating that the corresponding call object is abnormal; notify a corresponding real contact person through a preset alarm communication manner that someone is impersonating the contact person to talk with a user using the terminal device; notify a cloud server to mark a call software number being currently used by the corresponding call object as abnormal.

In an implementation, the abnormality detection module 206 is further to, when it is impossible to determine whether the call object is abnormal according to the detection result of the multi-stage neural network detection model, display, on the terminal device, corresponding prompt information; trigger a user to ask a question to the corresponding call object to determine authenticity of identity of the call object, or re-collect call data and determine whether the call object is abnormal using the newly collected call data and the multi-stage neural network detection model of the call object.

In an implementation, the abnormality detection module 206 is further to, before the currently collected call data and the real voice/video data of the call object are input into the multi-stage neural network detection model of the call object, perform initial identification based on the call data and according to a preset identity identification mode, wherein an initial identity identification mode comprises: call software number identification, voiceprint identification, face identification, limb movement identification, and/or lip language identification.

In an implementation, the abnormality detection module 206 is further to, when a result of the initial identification is voiceprint detection abnormality as the collected call data comprises a sound in an abnormal situation, but the detection result of the multi-stage neural network detection model is normal, trigger adding corresponding call data to real voice/video data of a corresponding user stored by a cloud server.

In an implementation, the data collection module 204 is to, when the terminal device is an access control intercom terminal, search for a matched user from a cloud server based on face and sound data collected by a voice/video collecting component of the access control; if the search is successful, acquire the corresponding user identifier; otherwise, determine the corresponding call object as a stranger.

Although the detection preparation module 202, the data collection module 204, and the abnormality detection module 206 are shown as separate modules within the apparatus for detecting an abnormality of a caller 200, these modules may be implemented in a single processor or each may be implemented in a separate processor.

An embodiment of the disclosure provides a non-volatile computer-readable storage medium storing instructions, wherein the instructions, when executed by a processor, cause the processor to perform operations of the above-described method for detecting an abnormality of a caller.

An embodiment of the disclosure provides an electronic device, including the above-described non-volatile computer-readable storage medium, and the processor accessible to the non-volatile computer-readable storage medium.

In addition, each embodiment of the disclosure may be implemented by a data processing program executed by a data processing device such as a computer. Obviously, the data processing program constitutes the disclosure. In addition, the data processing program usually stored in a storage medium is executed by directly reading the program out of the storage medium or by installing or copying the program to a storage device (such as a hard disk and or a memory) of the data processing device. Therefore, such storage medium also constitutes the disclosure. The storage medium may use a recording method with any type, such as a paper storage medium (such as paper tapes, etc.), a magnetic storage medium (such as floppy disks, hard disks, flash memories, etc.), an optical storage medium (such as compact disc-read only memory (CD-ROM), etc.), a magneto-optical storage medium ((Such as MO, etc.) and so on.

Therefore, the disclosure also discloses a storage medium in which a data processing program is stored, and the data processing program is to execute any embodiment of the foregoing method of the disclosure.

In addition, the method operations of the disclosure may be implemented not only by the data processing program but also by hardware, for example, logic gates, switches, application-specific integrated circuits (ASICs), programmable logic controllers, and embedded microcontrollers, and so on. Therefore, such hardware that may implement the method of the disclosure may also constitute the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for detecting an abnormality of identification of a caller in a first terminal device, the method comprising:
   based on reception of a call request from a second terminal device, identifying a call object associated with the second terminal device;
   identifying a pre-trained multi-stage neural network detection model trained based on first data of the call object associated with the second terminal device, in response to a determination to perform an abnormality detection of the call object associated with the second terminal device based on a user identifier of the call object;
   in response to acceptance of the call request, collecting second data of the call object according to a preset data collection policy;
   inputting the second data of the call object associated with the second terminal device into the pre-trained multi-stage neural network detection model; and
   determining whether an abnormality of identification of the call object associated with the second terminal device is detected according to a detection result output by the pre-trained multi-stage neural network detection model,
   wherein the second data comprises at least one of image data or voice data associated with a user of the second terminal device,
   wherein the pre-trained multi-stage neural network detection model is a two-stage neural network detection model of the call object associated with the second terminal device,
   wherein a first-stage of the two-stage neural network detection model detects at least one of a face, a voiceprint, a limb movement, or a lip language,
   wherein a second-stage of the two-stage neural network detection model determines whether the abnormality of identification of the call object associated with the second terminal device is detected according to an output by the first-stage, and
   wherein training of the pre-trained multi-stage neural network detection model based on the first data comprises:
   generating forgery data based on the first data of the call object associated with the second terminal device and using a preset AI generator, and
   performing a two-stage training on the two-stage neural network detection model of the call object associated with the second terminal device using the first data of the call object associated with the second terminal device and the forgery data.

2. The method of claim 1, further comprising:
determining whether the first data of the call object associated with the second terminal device is locally stored according to the user identifier of the call object associated with the second terminal device;
in a case that the first data of the call object associated with the second terminal device is locally stored, identifying, by the first terminal device, the first data locally; and
in a case that the first data of the call object associated with the second terminal device is not locally stored, identifying the first data of the call object associated with the second terminal device from a cloud server.

3. The method of claim 1, wherein the preset data collection policy comprises one of collecting the second data for only a preset length of time from the beginning of the call or collecting the second data periodically according to a preset collection cycle.

4. The method of claim 1,
wherein in a first-stage training of the two-stage training on the two-stage neural network detection model of the call object associated with the second terminal device:
a single detection of a corresponding detection type is performed using at least one of a face classification detection model, a voiceprint classification detection model, a limb movement classification detection model, or a lip language classification detection model, and
input data for a second-stage training of the two-stage training on the two-stage neural network detection model of the call object associated with the second terminal device is generated according to identified corresponding feature data, and
wherein in the second-stage training:
the identified corresponding feature data input is detected using a fully connected convolutional network, and
a current training parameter of the two-stage neural network detection model of the call object associated with the second terminal device is adjusted using a training result of the second-stage training.

5. The method of claim 1, wherein when the call is a video call, a triggering opportunity for determining whether an abnormality of identification of the call object associated with the second terminal device is detected when the terminal device detects that a human face appears in a video of the call.

6. The method of claim 1, wherein the determining of whether an abnormality of identification of the call object associated with the second terminal device is detected comprises:
determining, by the first terminal device, whether an abnormality of identification of the call object associated with the second terminal device is detected according to a detection result of a preset number of times of the pre-trained multi-stage neural network detection model of the call object associated with the second terminal device, the preset number of times being equal to or greater than 1.

7. The method of claim 1, further comprising:
when an abnormality of identification of the call object associated with the second terminal device is detected, triggering, by the first terminal device, a corresponding abnormality alarm process.

8. The method of claim 7, wherein the abnormality alarm process comprises:
displaying, on the first terminal device, prompt information indicating that the identification of the call object associated with the second terminal device is abnormal;
notifying a real contact person corresponding to the call object associated with the second terminal device through a preset alarm communication manner that someone is impersonating the real contact person to talk with a user of the first terminal device; and
notifying a cloud server to mark a call software number being used in the call by the corresponding call object as abnormal.

9. The method of claim 1, further comprising:
when it is impossible to determine whether an abnormality of identification of the call object associated with the second terminal device is detected, performing one of:
displaying, by the first terminal device, corresponding prompt information,
triggering a user of the first terminal device to ask a question to the call object associated with the second terminal device to determine an authenticity of the call object associated with the second terminal device, or
re-collecting second data, and determining whether an abnormality of identification of the call object associated with the second terminal device is detected using the newly collected second data and the pre-trained multi-stage neural network detection model of the call object associated with the second terminal device.

10. An apparatus for detecting an abnormality of identification of a caller, configured in a first terminal device, the apparatus comprising:
at least one processor configured to:
based on reception of a call request from a second terminal device,
identify a call object associated with the second terminal device,
identify a pre-trained multi-stage neural network detection model trained based on first data of the call object associated with the second terminal device, in response to a determination to perform an abnormality detection of the call object associated with the second terminal device based on a user identifier of the call object,
in response to acceptance of the call request, collect second data of the call object according to a preset data collection policy,
input the collected second data of the call object associated with the second terminal device into the pre-trained multi-stage neural network detection model, and
determine whether an abnormality of identification of the call object associated with the second terminal device is detected according to a detection result output by the pre-trained multi-stage neural network detection model,
wherein the collected second data comprises at least one of image data or voice data,
wherein the pre-trained multi-stage neural network detection model is a two-stage neural network detection model of the call object associated with the second terminal device, wherein a first-stage of the two-stage neural network detection model detects at least one of a face, a voiceprint, a limb movement, or a lip language, wherein a second-stage of the two-stage neural network detection model determines whether the abnormality of identification of the call object associated with the second terminal device is detected according to an output by the first-stage, and wherein training of the pre-trained multi-stage neural network detection model based on the first data comprises:

generating forgery data based on the first data of the call object associated with the second terminal device and using a preset AI generator; and performing a two-stage training on the two-stage neural network detection model of the call object associated with the second terminal device using the first data of the call object associated with the second terminal device and the forgery data.

11. The apparatus of claim 10, wherein the at least one processor is further configured to:

determine whether the first data of the call object associated with the second terminal device is locally stored according to the user identifier of the call object associated with the second terminal device, if the first data of the call object associated with the second terminal device is locally stored, identify the first data locally, and if the first data of the call object associated with the second terminal device is not locally stored, identify the first data of the call object associated with the second terminal device from a cloud server.

12. The apparatus of claim 10, wherein the preset data collection policy comprises one of:

collecting the second data for only a preset length of time from the beginning of the call, or collecting the second data periodically according to a preset collection cycle.

13. The apparatus of claim 10, wherein in a first-stage training of the two-stage training on the two-stage neural network detection model of the call object associated with the second terminal device:

a single detection of a corresponding detection type is performed using at least one of a face classification detection model, a voiceprint classification detection model, a limb movement classification detection model, or a lip language classification detection model, and input data for a second-stage training of the two-stage training on the two-stage neural network detection model of the call object associated with the second terminal device is generated according to identified corresponding feature data, and wherein in the second-stage training:

the identified corresponding feature data input is detected using a fully connected convolutional network, and a current training parameter of the two-stage neural network detection model of the call object associated with the second terminal device is adjusted using a training result of the second-stage training.

14. The apparatus of claim 10, wherein the at least one processor is further configured to collect image data without a beauty treatment when an application for making the call enables a beauty function.

15. The apparatus of claim 10, wherein the at least one processor is further configured to trigger, when the call is a video call, determining whether an abnormality of identification of the call object associated with the second terminal device is detected when detecting that a human face associated with a user corresponding to the second terminal device appears in a video of the call.

16. The apparatus of claim 10, wherein the at least one processor is further configured to determine whether an abnormality of identification of the call object associated with the second terminal device is detected according to a detection result of a preset number of times of the pre-trained multi-stage neural network detection model of the call object associated with the second terminal device, the preset number of times being equal to or greater than 1.

17. The apparatus of claim 10, wherein the at least one processor is further configured to trigger a corresponding abnormality alarm process when an abnormality of identification of the call object associated with the second terminal device is detected.

18. The apparatus of claim 17, wherein the apparatus further comprises a display operatively coupled to the at least one processor, and wherein the at least one processor is further configured to control the display to:

display, on the first terminal device, prompt information indicating that the identification of the call object associated with the second terminal device is abnormal, and wherein the at least one processor is further configured to:

notify a real contact person corresponding to the call object associated with the second terminal device through a preset alarm communication manner that someone is impersonating the real contact person to talk with a user of the first terminal device, and notify a cloud server to mark a call software number being used in the call by the corresponding call object as abnormal.

19. The apparatus of claim 10, wherein the apparatus further comprises a display operatively coupled to the at least one processor, and wherein the at least one processor is further configured to, when it is impossible to determine whether an abnormality of identification of the call object associated with the second terminal device is detected, perform one of:

control the display to display corresponding prompt information, trigger a user of the first terminal device to ask a question to the call object associated with the second terminal device to determine an authenticity of the call object associated with the second terminal device, or re-collect second data and determine whether an abnormality of identification of the call object associated with the second terminal device is detected using the newly collected second data and the pre-trained multi-stage neural network detection model of the call object associated with the second terminal device.

* * * * *